US006769615B2

(12) United States Patent
Resseguie

(10) Patent No.: US 6,769,615 B2
(45) Date of Patent: Aug. 3, 2004

(54) MULTI-PASS MERGE PROCESS FOR THE CHECK PROCESSING CONTROL SYSTEM

(75) Inventor: Donald Resseguie, Hunterville, NC (US)

(73) Assignee: Software Corporation International, Toledo, OH (US)

( * ) Notice: Subject to any disclaimer, the term of this patent is extended or adjusted under 35 U.S.C. 154(b) by 0 days.

(21) Appl. No.: 10/373,354

(22) Filed: Feb. 25, 2003

(65) Prior Publication Data

US 2003/0201324 A1 Oct. 30, 2003

Related U.S. Application Data

(60) Provisional application No. 60/375,718, filed on Apr. 26, 2002.

(51) Int. Cl.[7] ................................................. G06K 7/08
(52) U.S. Cl. ........................ 235/449; 235/375; 235/379; 235/493; 705/45
(58) Field of Search ................................. 235/449, 375, 235/379, 380, 381, 487, 493; 705/43, 45, 62

(56) References Cited

U.S. PATENT DOCUMENTS

| | | | | | |
|---|---|---|---|---|---|
| 4,547,899 A | * | 10/1985 | Nally et al. | .................. | 362/139 |
| 5,532,464 A | * | 7/1996 | Josephson et al. | .......... | 235/379 |
| 5,544,043 A | * | 8/1996 | Miki et al. | ..................... | 705/45 |
| 5,694,471 A | * | 12/1997 | Chen et al. | ................... | 705/76 |
| 5,783,808 A | * | 7/1998 | Josephson | ................... | 235/379 |
| 6,182,896 B1 | * | 2/2001 | Momose | ..................... | 235/449 |
| 6,464,134 B1 | * | 10/2002 | Page | ........................... | 235/379 |

* cited by examiner

Primary Examiner—Thien M. Le
Assistant Examiner—Edwyn Labaze
(74) Attorney, Agent, or Firm—Reed Smith LLP

(57) ABSTRACT

In a check processing system, a multi-pass merging process is used to compare the originally scanned check data with subsequently scanned check data in a repetitive manner according to multiple match profiles. This process allows a user to begin with a very strict match profile in a first pass and use a less strict match profile on each subsequent pass. All previous matches are remembered so that they will not be matched with unlike items in any subsequent pass. This multiple pass merging process increases the matching rate and reduces mismatch errors.

16 Claims, 4 Drawing Sheets

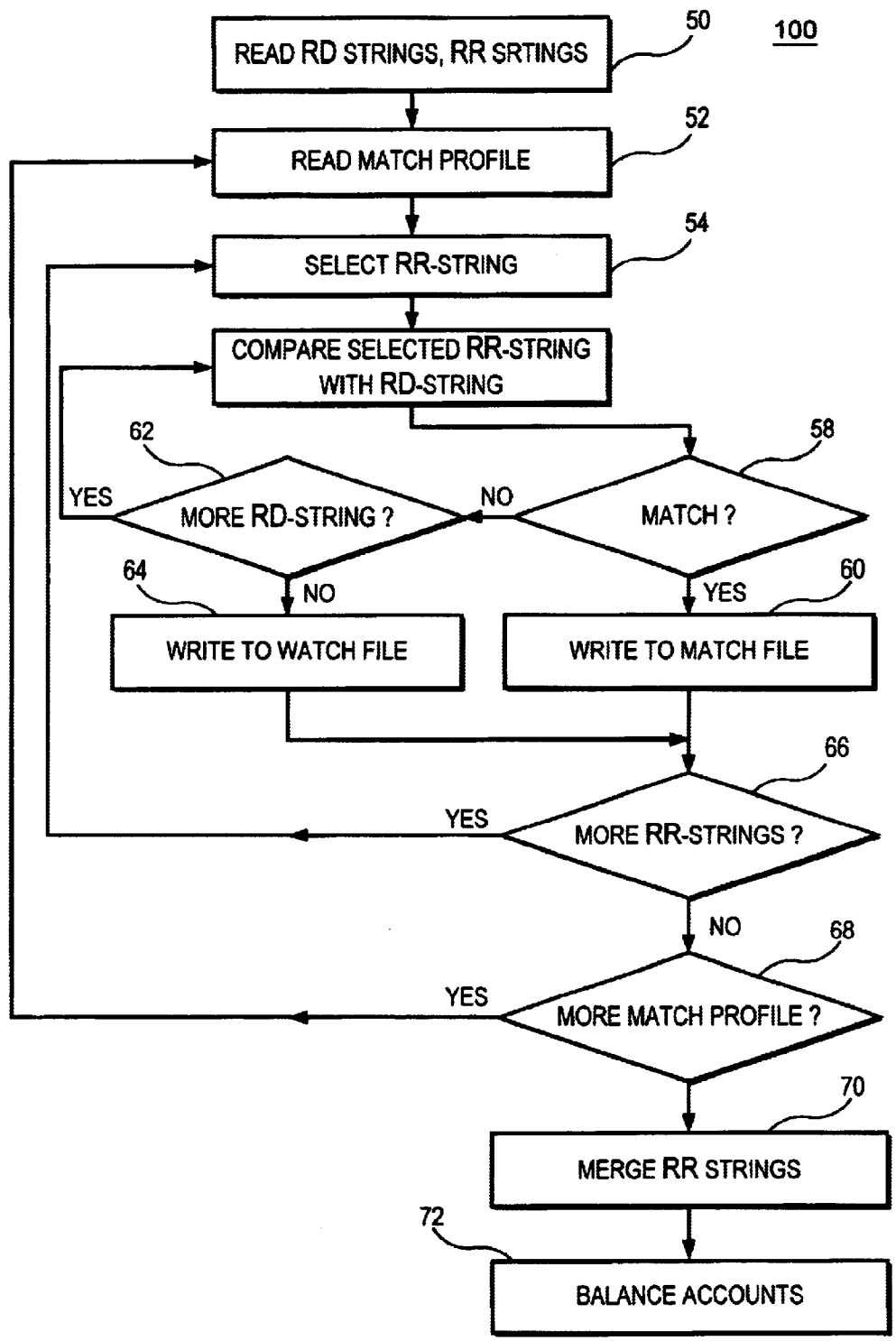
F I G. 2

RD String Table

| Sequence No. | Routing No. | Acct. No. | Amount |
|---|---|---|---|
| ... | ... | ... | ... |
| 0013456 | 1221-2150 | φ | 25.00 |
| ... | ... | ... | ... |
| 0013575 | 1221-222* | 1234 | 50.00 |
| ... | ... | ... | ... |

RR String Table

| Sequence No. | Routing No. | Acct. No. | Amount |
|---|---|---|---|
| 00965329 | 1221-2150 | 5214 | 25.00 |
| ... | ... | ... | ... |
| 00965461 | 1221-2222 | 1234 | 50.00 |
| ... | ... | ... | ... |

| Match profile | 3 points for acct. no. match |
| --- | --- |
| | 2 points for amount match |
| | 2 points for routing no. match |
| | Match if total ≥ 5 points |

F I G. 3

RD String Table

| Sequence No. | Routing No. | Acct. No. | Amount |
|---|---|---|---|
| . . . | . . . | . . . | . . . |
| 0013456 | 1221-2150 | φ | 25.00 |
| . . . | . . . | . . . | . . . |
| 0013575 | 1221-222* | 1234 | 50.00 |
| . . . | . . . | . . . | . . . |

RR String Table

| Sequence No. | Routing No. | Acct. No. | Amount |
|---|---|---|---|
| 00965329 | 1221-2150 | 5214 | 25.00 |
| . . . | . . . | . . . | . . . |
| 00965461 | 1221-2222 | 1234 | 50.00 |
| . . . | . . . | . . . | . . . |

| Match profile | 3 points for acct. no. match |
| | 2 points for amount match |
| | 2 points for routing no. match |
| | Match if total ≥ 5 points |

| Match profile | 2 points for acct. no. match |
| | 2 points for amount match |
| | 2 points for routing no. match |
| | Match if total ≥ 4 points |

FIG. 4

MULTI-PASS MERGE PROCESS FOR THE CHECK PROCESSING CONTROL SYSTEM

RELATED APPLICATIONS

This application claims priority from a provisional patent application Ser. No. 60/375,718, filed Apr. 26, 2002, which is incorporated herein by reference in its entirety.

TECHNICAL FIELD

The present invention generally relates to a financial document processing system, and, more particularly, to a check processing system.

BACKGROUND OF THE INVENTION

There is a well-defined and well-known process within the banking system of the United States that supports checks as a payment mechanism, commonly known as the check processing or check clearing system.

In a clearing process, a payee deposits a check with the payee's bank. The bank processes the check and forwards it to a clearing agent. The clearing agent then pays the check amount to the payee bank. The types of clearing agents are Federal Reserve Banks, correspondent banks and local clearinghouses (an arrangement whereby a group of banks located in the same geographic area agree to exchange each others checks for presentment at specified times during each business day). The clearing agent physically presents the check to the payer bank and subtracts the check amount from the payer bank. Before the check amount is deducted from the payer's account, the amount, account number, and other important information must be extracted from the check.

The highly automated form of this extraction process performed by banks is done by a check processing control system such as CPCS (Check Processing Control System) made by IBM Corporation of Armonk, N.Y. During the check capture process by the payer bank, the CPCS performs what is known as a prime pass capture of information from the Magnetic Ink Character Recognition ("MICR") line. The first time a check is passed through a bank's capture equipment, it is referred to as the prime pass capture. The MICR line consists of specially designed numerals (E-13B Font) that are printed on the bottom of a check using magnetic ink. The MICR data fields include the bank routing number, bank transit number, account number, check serial number, check amount, process code and extended process code. Background information related to magnetic ink character recognition systems, and check processing and clearing systems are disclosed in U.S. Pat. No. 5,870,725 issued Feb. 9, 1999 and U.S. Pat. No. 6,243,504 issued Jun. 5, 2001, both of which are incorporated herein in their entirety.

As checks pass through a high speed reader/sorter using CPCS, the magnetic ink is recognized and converted to information that can be used by computers and software for sorting the checks. The reader/sorter is a machine that magnetically recognizes the MICR line on checks to capture the information encoded there, and also uses the information to sort the checks into pre-specified temporary storage slots. This sorting results in a meaningful grouping of the checks that can be used for further processing. Reader/sorters in use at banks today are highly automated capture devices that can capture up to 100,000 checks per hour.

Subsequently, in a process known as balancing, the debits against the accounts associated with the checks are compared with the credits (the payment total made by the bank) to ensure that they are equal.

During the capture process by the high speed reader/sorter, the MICR data is stored in a string known as I-Strings. Each I-String data time or record contains a unique sequence number for each check for each scan. The I-Strings may contain erroneous data from checks that have been rejected by the reader/sorter as being at least partially unreadable. For example, some checks may have partially incorrect routing number due to folding of the check and some checks may have no correct data because they were scanned upside down. The erroneous data for each unreadable check are stored in the I-string and later to a reject string known as RD-String which is created when the CPCS task DIST (Distribution) is run against the I-string. The RD-String contains all of the prime pass reject items.

The erroneous data for the rejected checks can be corrected manually in a process known as Online Reject Reentry (OLRR). In the OLRR process, an operator looks at a screen displaying the rejected item and manually compares it to the actual rejected checks. When the match is found, the operator manually enters the corrected information into a computer. In this case, a simple sequence merge of the manually entered information with the originally scanned data in an I-String is possible because it involves only a single sequence number for each rejected check.

A more efficient method of merging is a high speed reject repair (HSRR) process which allows the bank to recondition the rejected checks and pass them through a high speed reader/sorter a second time to recapture the data in a new string called HSRR I-String. An RR-string is created by merging the HSRR I-string with the repaired rejects from the HSRR capture. Because the rejected checks have been scanned for the second time, the HSRR I-string record for each rejected check receives a new sequence number that is different from the sequence number of the corresponding I-String. Thus, a simple sequence number merge of the RR String data into the corresponding I-String data cannot be done. Moreover, the data in the repaired RR String may look quite different from the corresponding original I-String item.

Consequently, merging of the RR String data with the I-String data in the case of the more efficient HSRR process is a complex procedure that involves matching the individual MICR data fields stored in the two strings. To assist in the merge process, CPCS provides a match profile that is customizable by the user. The match profile typically specifies which MICR fields are to be used during the merge process, how many significant digits need to match, how many digit errors are allowed and how much weight each MICR field should have.

However, the match profile should be set up with great care. If the profile is too strict, much of the data cannot be matched and must be matched by hand in a subsequent balancing process which is a very labor intensive process. On the other hand, if the match profile is too loose, many items that correspond to different checks will be matched incorrectly which results in even more manual work during the subsequent balancing process. As can be appreciated, the profile settings are very sensitive to even slight changes in the matching criteria and are subject to error.

Therefore, there is a need to provide a system and method for an improved merging operation that produces a higher matching rate with less error. It would be desirable to provide such a system with as little change to the bank's current check processing work flow as possible to minimize a user's learning curve.

SUMMARY OF THE INVENTION

According to the principles of the present invention, a novel method and system of processing rejected checks is provided.

Conventionally, a check scanner reads MICR data on the checks which include bank routing information, checking account number, check serial number, check amount, among others. A first pass data includes MICR data of checks that have been scanned for the first time. The second pass data includes MICR data for the rejected checks that have been scanned for the second time, usually after the rejected checks have been reconditioned. In a process known as merging, the second pass data are then compared against the first pass data to find a match according to a match profile which contains the match criteria. The matched data are then passed to a balancing application for final proofing prior to extracting the data for debiting and crediting the accounts involved. However, conventional methods only allowed a single match profile in a one pass merge process.

According to the present invention, a multi-pass merging process is used where the step of comparing the second pass data against the first pass data is performed repetitively using different match profiles. Preferably, a match profile for a subsequent comparison step is less strict than the match profiles of the previous comparison steps. In that embodiment, all previous matches are marked so that they will not be matched with any unlike items in subsequent comparison steps.

This multiple pass process in comparing the original data and the reconditioned data substantially increases the matching rate and reduces mismatch errors. Moreover, since the present invention modifies the conventional single match profile method and no change to the bank's current workflow is needed, it reduces the user's learning curve.

BRIEF DESCRIPTION OF THE DRAWINGS

FIG. 2 illustrates an exemplary software routine for merging originally scanned check data with a subsequently scanned data for the rejected checks.

FIG. 3 illustrates an example of an originally scanned data table, subsequently scanned data table and a match profile for merging the data together.

FIG. 4 illustrates an example of an originally scanned data table, subsequently scanned data table and multi-pass match profiles for merging the data together according to the present invention.

DETAILED DESCRIPTION OF THE INVENTION

Figure 1:
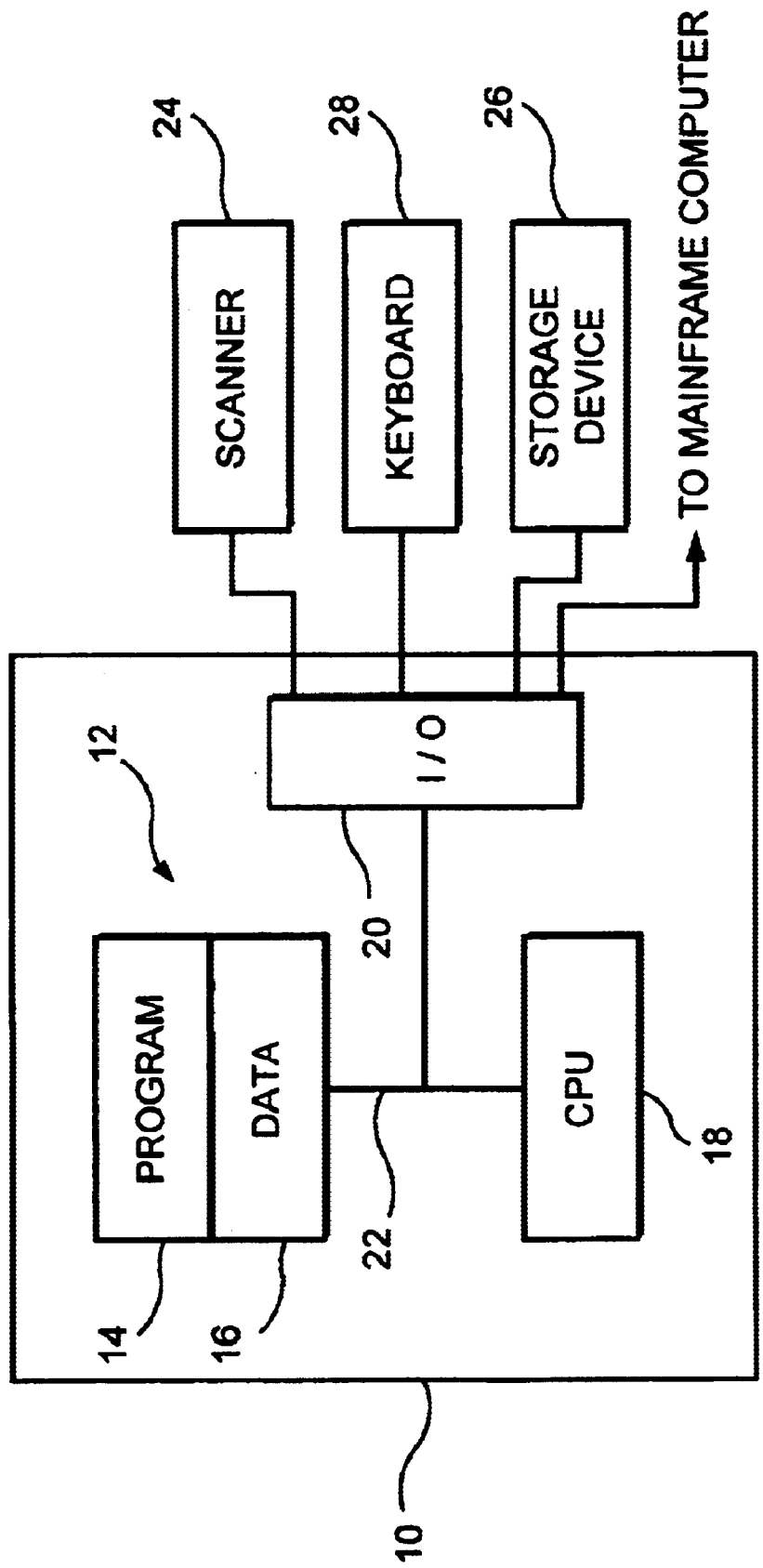
FIG. 1 is a diagram of a check processing system according to one embodiment of the present invention.

As discussed above, the conventional merge process to match originally scanned items (I Strings) with the subsequently scanned items (HSRR I Strings) used only a single match/merge profile that was very sensitive to the criteria being used and the types of checks being processed.

According to a preferred embodiment of the present invention, multiple match profiles using repetitive merge process is used. The present invention allows a user to start with a strict match profile on the first pass and to use a slightly less strict match profile on each subsequent merge pass. All matching decisions from the previous pass are remembered so that unlike items will not be matched in a subsequent pass. This multiple pass approach using multiple match profiles allows a bank to substantially improve the accuracy of the matching and produce a higher merge rate, which results in substantial cost savings for the bank. Moreover, the present invention requires very little training since it modifies an existing merge process and no change to the bank's current workflow is needed.

As shown in FIG. 1, a check processing system 10 according to one embodiment of the present invention includes a memory 12, CPU 18, I/O interface 20 which are commonly connected to each other through a bus 22. The memory 12 contains a program memory 14 for storing software programs such as a merge program 100 as shown in FIG. 2 to be executed by the CPU 18. The data memory 16 stores the various data needed by the programs stored in the memory 14. The types of data include I-Strings, RR Strings, match profile, and temporary files that are needed by the software programs. A scanner 24 connected to the I/O interface 20 captures the MICR data line on the check and passes them to a program stored in the memory 14 which converts the data to a Strings format and stores them in a storage device 26 which is also connected to the I/O interface. A keyboard 28 coupled to the I/O interface 20 allows a user to control the check processing operation and the merge program of FIG. 2.

A detailed operation of the merge process according to the present invention will now be described with reference to FIGS. 2–4. According to the principles of the present invention, FIG. 2 illustrates a routine 100 for processing checks that have been rejected by the check scanner 24 in a first pass and which have been rescanned in a second pass.

As discussed above in the background section, the MICR data scanned in the first or prime pass are stored in a I-String and the erroneous data for the rejected checks are stored in a RD String created by the CPCS task DIST running against the Prime I-string. The checks can be rejected for a variety of reasons including folding, upside down positioning and tearing of a check. Once the rejected checks are reconditioned, for example by straightening the folded check, they are rescanned using the HSRR process in a second pass. The rescanned data are stored in a RR String.

In step 50, the RD String and RR String are read into the memory 16. In step 52, a match profile that has been programmed by the user is also read into the memory 16. A simple example of a match profile 30 is shown in FIG. 3. The match profile 30 assigns 3 points if the account numbers match, 2 points if the check amounts match, and 2 points if the routing numbers match. A match is made if the total points assigned is equal to or greater than 5. As can be appreciated, the match profile 30 can be made simpler or more sophisticated depending on the user's preference. For example, it can be programmed so that 3 points can be assigned if at least the 5 most significant digits of the account numbers match, rather than all the digits. As another example, 3 points can be assigned if at least 5 or more digits of the account numbers match.

In step 54, a RR String record is selected starting with a first record. Using the RR String data table of FIG. 3 as an example, the first RR String record 34 selected has a sequence number of 00965329. In step 56, the selected RR String record is compared with a RD String record starting with a first record according to the retrieved match profile 30. Accordingly, points are assigned to each matching field of the string in step 56. As an example, if the selected RR String record 34 is being compared to the RD String record 36, the routing numbers and amounts match. Thus, 2 points are assigned to each matching field according to the match profile 30.

In step 58, a decision is made as to whether there is a match between the selected RD String record and selected RR String record. According to the match profile 30, it is determined to be a match if the totaled points are greater than or equal to 5. Continuing with the same example, the selected RR String record 34 does not match the selected RD String record 36 since the sum of assigned points is only 4 which is less than 5.

For the RR String record 38 and RD String record 40, the account numbers and amounts match. The routing numbers do not match because the last digit of the routing number for the RD String record 40 includes an asterisk "*" meaning that the scanner 24 could not read the last digit. Thus, 2 points are assigned for the matching check amount and 3 points are assigned for the matching account number according to the match profile 30. Since the total equals 5, the RR String record 38 and RD String record 40 are determined to match according to the match profile 30.

If the decision in step 58 is no, then step 62 is executed. In step 62, it is determined whether there are more RD String records to be tested against the selected RR String. If the decision is yes, then the routine 100 goes back to step 56 where another RD String record is selected and compared to the selected RR String records. The steps 56, 58 and 62 are repeated until either a match is made or all RD String records are compared against the selected RR String.

If the decision in step 58 is yes, then there was a match and step 60 is executed. In step 60, an entry is made in a match file called "MATCHFIL" which is used to merge the Prime I-String and RR String data in a later step. In the file MATCHFIL, an entry containing the sequence numbers of the matching RD String record and RR String record is made to mark the records as matched so that they are excluded from being compared in a subsequent pass.

If the decision in step 62 is no, it means that no match was found for the selected RR String record and step 64 is executed. In step 64, an entry is made in the file MATCHFIL which indicates that no match was made for the selected RR String record. One example entry contains the sequence number of the non-matching RR String record and a series of hex F characters where the matching RD String sequence number would have been inserted. The hex F portion indicates that the selected RR String is a free item, meaning that it has not been matched with a corresponding RD String record. Note that if the selected RR String record is subsequently matched in a later pass, step 60 writes the matching entry over the non-matching entry that was just made in MATCHFIL.

In step 66, a decision is made as to whether there are more RR String records to be merged. If the decision is yes, then the routine 100 goes back to step 54 where the next RR String record, which has not been matched in previous passes, is selected. The steps 56 through 66 are repeated until the decision in step 66 is no, which means that all RR String records have been processed according to the match profile 30.

In a conventional merge process, it only allowed a single pass comprising the above steps. According to the present invention, however, the above steps are repeated with a different match profile as will be explained below.

In step 68, a decision is made as to whether there is another match profile to be processed. If the decision is yes, then the routine 100 reads the new match profile into memory 16 in step 52 and repeats steps 52–66 according to the new match profile. Note that in a pass other than the first pass, step 54 looks into MATCHFIL to skip the RR String records that have been matched in any previous pass.

In one embodiment, a file name called "MRG2S256" is used to store the original match profile 30. Starting from the second match profile for a second pass, the fifth character in the file name represents what pass the match profile represents. For example, the name "MRG21256" represents a second pass match profile 32 and the name "MRG22256" represents a third pass match profile. Preferably, the first pass match profile should have the strictest matching criteria which will result in matching the least number of items or strings. Subsequent pass match profile should be less strict than the match profile for the previous pass. For example, the matching criteria 32 for the second pass is less strict than the match profile 30 of the first pass.

Assuming the routine 100 has just finished a first pass merge process, in step 68, it looks to see if a file named "MRG21256" is present. If it exists, then the decision is yes and the merge process comprising steps 52–66 are repeated. Referring to FIG. 4, the second pass match profile 32 does exist. Thus, steps 52–66 are repeated using the match profile 32.

As can be appreciated by persons of ordinary skill in the art, using the data in FIG. 3, the routine 100 matches the RR String 38 with RD String 40, but fails to match the RR String 34 with the corresponding RD String 36. According to the invention, however, the second pass using the second pass match profile 32 as shown in FIG. 4 does match the RR String 34 with the corresponding RD String 36 because the total assigned points of 4 is equal to the minimum required for a match according to the match profile 32.

If the decision in step 68 is no, that means that there are no more match profiles to process and step 70 is executed. In step 70, actual merging of the matched RR-String records and RR-String records into a merged string known as 00M-String is made in a conventional manner by using the MATCHFIL containing the matching data. In step 72, the 00M-String is used to balance the accounts involved.

The above-described multiple pass approach using multiple match profiles allows a bank to produce a substantially higher merge rate, resulting in substantial cost savings for the bank. Since the present invention uses the familiar match profile concept present in the conventional method and no modification to the existing CPCS workflow is needed, it requires very little training for the users.

A system and method for more efficiently merging the scanned check data have been disclosed herein. While various embodiments have been described in this application for illustrative purposes, the claims are not limited to the embodiments described herein. Equivalent devices or steps may be substituted for those described, which operate according to the principles of the present invention, and thus fall within the scope of the claims.

What is claimed is:

1. A method of reading and processing data from a plurality of checks that have been presented to a financial institution for payment, the method comprising:

(a) reading and storing a first pass data from a plurality of checks, wherein a check with an incomplete reading of check data on the check is rejected;

(b) reading a second pass data for checks that have been rejected in the first pass;

(c) for each rejected check, comparing the second pass data of the each rejected check with the stored first pass data of the plurality of checks to find a match therebetween based on a first match profile; and (d) for each rejected check, comparing the second pass data of the each rejected check with the first pass data of the plurality of checks to find a match therebetween based on a second match profile, the first match profile being more strict than the second match profile.

2. The method according to claim 1, further comprising for each matched check, creating a merged data containing the first pass data and the second pass data of the each matched check.

3. The method according to claim 1, further comprising repeating step (d) using a different match profile until all match profiles have been used.

4. The method according to claim 1, wherein:
in step (c), each matched check is marked as matched; and
in step (d), the marked checks are excluded from being compared.

5. The method according to claim 1, wherein:
the first match profile is more strict than the second match profile;
in step (c), each matched check is marked as matched; and
in step (d), the marked checks are excluded from being compared.

6. A method of reading and processing MICR check data from a plurality of checks that have been presented to a financial institution for payment, the method comprising:

(a) reading a first pass data from a plurality of checks, wherein a check with an incomplete reading of check data on the check is rejected;

(b) reading a second pass data for checks that have been rejected in the first pass;

(c) for each rejected check, comparing the second pass data with the first pass data of the plurality of checks to find a match therebetween based on a first match profile; and (d) repeating step (c) based on a second match profile that is less strict than the first match profile.

7. The method according to claim 6, further comprising:
for each matched check, creating a merged data containing the first pass data and the second pass data of the each matched check;
passing the merged data to a balancing application to balance the accounts associated with the merged data.

8. The method according to claim 6, wherein step (d) includes repeating step (c) using a different match profile until all match profiles have been used.

9. The method according to claim 6, wherein:
in step (c), each matched check is marked as matched; and
in step (d), the marked checks are excluded from being compared.

10. A system for reading and processing data from a plurality of checks that have been presented to a financial institution for payment, the system comprising:

a check scanner that reads check data disposed on the checks and rejects checks with an incomplete reading of the check data;

a storage device coupled to the check scanner and operable to store a first pass data from a plurality of checks read from the check scanner and to store a second pass data for checks that have been rejected by the check scanner in the first pass;

a check processing program stored in the storage; and a processor that executes the check processing program, the check processing program being operable to compare for each rejected check the second pass data of the each check with the first pass data of the plurality of checks to find a match therebetween based on a first match profile, and being further operable to repeat the comparing for each rejected check based on a second match profile that is different from the first match profile.

11. The system according to claim 10, further comprising an input device coupled to the processor and operable to receive the first and second match profiles from a user for storage by the storage device.

12. The system according to claim 10, wherein for each matched check, the check processing program creates a merged data containing the first pass data and the second pass data of the each matched check.

13. The system according to claim 10, wherein the check processing program repeats the comparing until all match profiles programmed by a user have been used.

14. The system according to claim 10, wherein the check processing program marks each matched check and the marked checks are excluded from being compared in the repeated comparing.

15. The system according to claim 10, wherein the first match profile is more strict than the second match profile.

16. The system according to claim 10, wherein:
the first match profile is more strict than the second match profile; and
the check processing program marks each matched check and excludes the marked checks from being compared in the repeated comparing.

* * * * *